United States Patent [19]
Kiryuschev et al.

[11] Patent Number: 6,072,619
[45] Date of Patent: Jun. 6, 2000

[54] ELECTRO-OPTICAL LIGHT MODULATING DEVICE

[75] Inventors: Irina Kiryuschev, Tel Aviv; Lev Zaidenberg, Raanana, both of Israel

[73] Assignee: Visson Ip, LLC, Dover, Del.

[21] Appl. No.: 09/273,266

[22] Filed: Mar. 22, 1999

[51] Int. Cl.[7] .................................................. G02F 1/03
[52] U.S. Cl. .......................................... 359/245; 359/252
[58] Field of Search ................................. 359/245, 252, 359/254, 265

[56] References Cited

U.S. PATENT DOCUMENTS

| | | | |
|---|---|---|---|
| 4,234,907 | 11/1980 | Daniel | 362/32 |
| 4,907,132 | 3/1990 | Parker | 362/32 |
| 5,568,964 | 10/1996 | Parker et al. | 362/32 |
| 5,585,958 | 12/1996 | Giraud | 359/265 |

*Primary Examiner*—Georgia Epps
*Assistant Examiner*—Suzanne Letendre
*Attorney, Agent, or Firm*—Mark M. Friedman

[57] ABSTRACT

A light modulating device, is provide, which includes a first set of fibers and a second set of fibers being arranged to form a two dimensional array of junctions between fibers of the first set of fibers and fibers of the second set of fibers. Each of the fibers of the first and second sets of fibers includes a longitudinal conductive element, whereas fibers of at least one of the first and second sets of fibers, at least at the junctions, further include a coat of an electro-optically active substance being capable of reversibly changing its optical behavior when subjected to an electric or magnetic flux or field. The light modulating device has advantages over prior art light modulating devices because it is (i) readily fabricated in any desired dimensions; (ii) flexible; (iii) foldable/collapsible; (iv) simple to manufacture; and therefore (v) cost-effective.

24 Claims, 1 Drawing Sheet

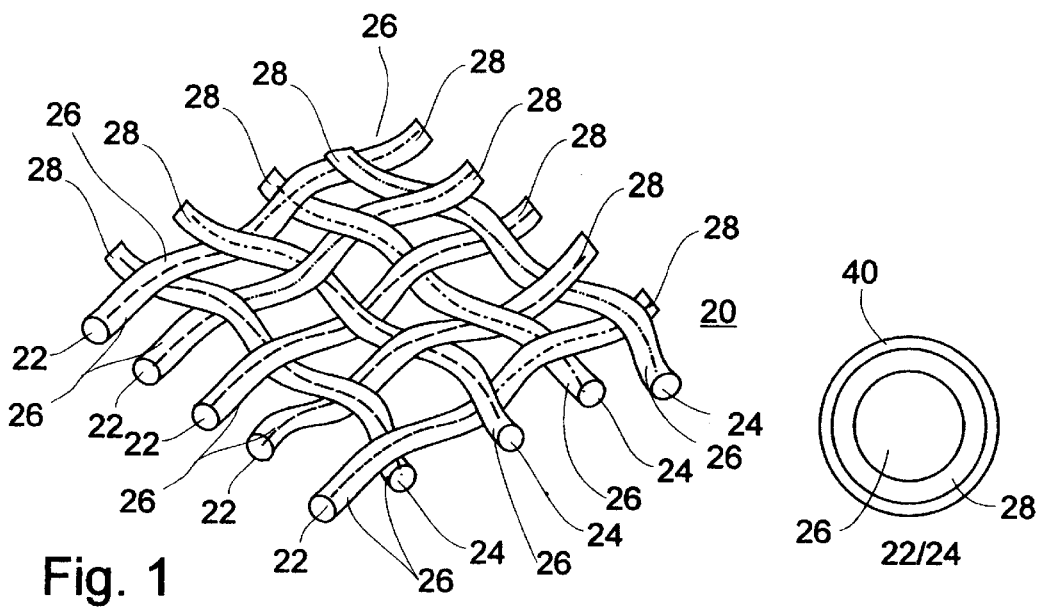
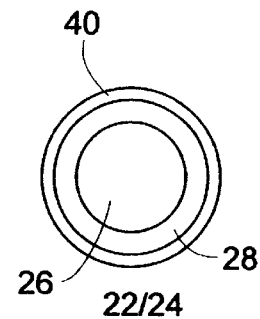
Fig. 3
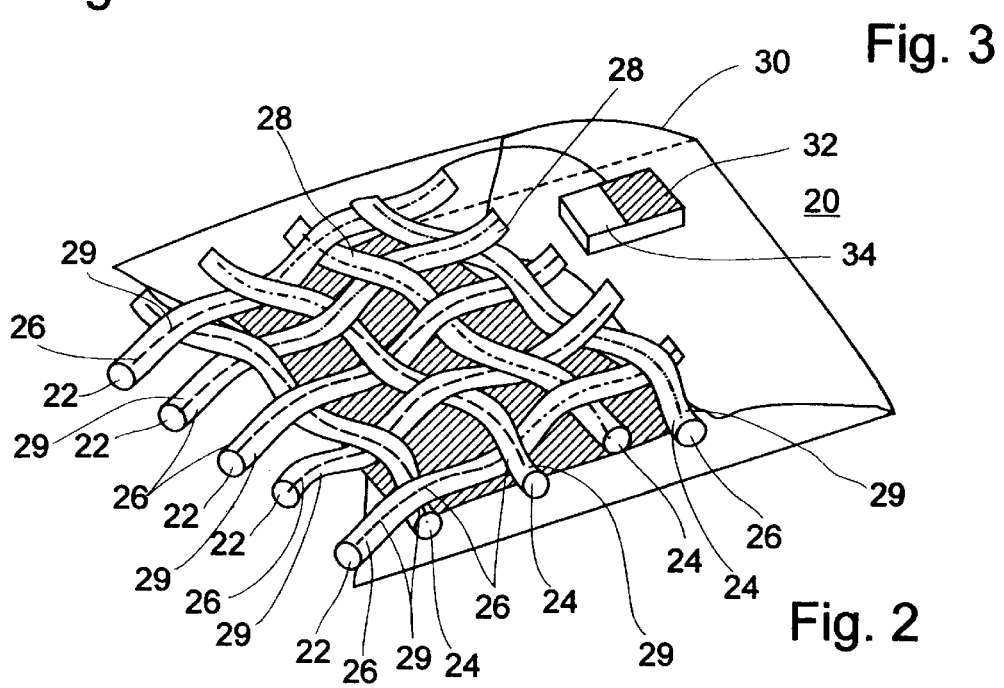
Fig. 2
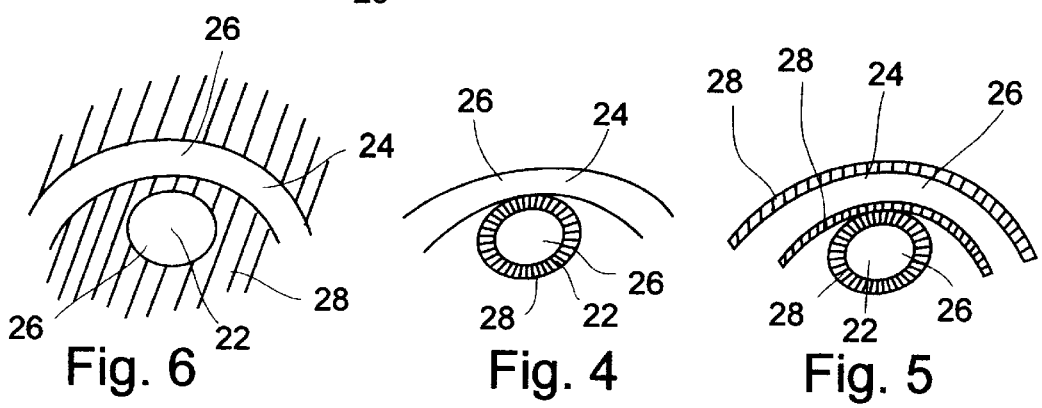
Fig. 6  Fig. 4  Fig. 5

ELECTRO-OPTICAL LIGHT MODULATING DEVICE

FIELD AND BACKGROUND OF THE INVENTION

The present invention relates to an electro-optical light modulating device and to methods of its fabrication. More particularly, the present invention relates to an electro-optical device which can be used to display an image by controllably changing its optical behavior at selected locations under the influence of a magnetic or electric flux or field.

As used herein throughout the term "image" refers to any pictorial, graphic and/or alphanumeric information.

As used herein throughout the verb "display" refers to a visual presentation of any type and in any context.

Electro-optical light modulating devices are structures designed to change their optical behavior in response to an applied electric or magnetic flux or field, e.g., electric potential, voltage or current. As such, electro-optical light modulating devices include an electro-optically active substance which is capable of reversibly changing its optical behavior when subjected to an electric or magnetic flux or field and an electric or magnetic flux or field generator for generating the flux or field. As further detailed hereinunder, a careful design achieved by "high precision methods" enables the application of an electric or magnetic flux or field at desired spatial locations, so as to form images.

As used herein throughout, the term "substance" refers to any compound, composition, dispersion, suspension or mixture in a solid, gel or fluid state.

Electro-optically active substances can be broken into electrochromic light modulating substances and electrophoretic light modulating substances.

Electrochromic light modulating substances include a variety of chemicals and polymers being capable of reversibly changing their color and/or their optical density as a response to electrochemical oxidation-reduction reactions. An example for the use of an electrochromic light modulating substance in an electro-optical light modulating device is disclosed in U.S. Pat. No. 5,585,958, which is incorporated by reference as if fully set forth herein.

Electrophoretic light modulating substances are suspensions including colored or opaque particles (e.g., beads) carrying a magnetic or electric charge and a fluid for suspending these particles. Being charged, the particles are capable of reversibly and controllably changing their disposition as a response to an applied magnetic or electric flux or field by executing a movements, e.g., a linear and/or rotational movement. Examples for the use of electrophoretic light modulating substances in electro-optical light modulating devices are disclosed in U.S. Pat. Nos. 5,057,363; 4,211,668; and 3,383,382, which are incorporated by reference as if fully set forth herein. In these cases, magnetically or electrostatically charged particles suspended in a dielectric fluid are used and are capable of changing the optical behavior of the suspension under the influence of a magnetic or an electric flux or field.

Be it electrochromic or electrophoretic light modulating substance based electro-optical light modulating device, all electro-optical light modulating devices include a magnetic or electric flux or field generator. The generator typically includes at least a pair of electrodes, of which at least one is formed as a dense pattern (e.g., a set of lines or a grid) applied to a rigid, planar and continuous substrate by microphotolithography, multilayer screen printing or by any other technique of high precision. A second electrode employed is typically transparent and is made of a thin electroconductive film, typically deposited over a transparent insulating substrate electrically separating the electrodes. The electro-optical light modulating substance is positioned as a layer in between the electrodes.

As a result, prior art electro-optical light modulating devices are limited in their dimensions, in their flexibility and in their foldability. In addition, the manufacturing process of such prior art electro-optical light modulating devices is complicated and cost-ineffective.

There is thus a widely recognized need for, and it would be highly advantageous to have, an electro-optical light modulating device devoid of the above limitations, which device is (i) readily fabricated in any desired dimensions; (ii) flexible; (iii) foldable/collapsible; (iv) simple to manufacture; and therefore (v) cost-effective.

SUMMARY OF THE INVENTION

Thus, it is an object of the present invention to provide an electro-optical light modulating device which overcomes the aforementioned limitations associated with prior art electro-optical light modulating devices.

It is another object of the present invention to provide an electro-optical light modulating device which is flexible.

It is yet another object of the present invention to provide an electro-optical light modulating device which is foldable/collapsible.

It is yet another object of the present invention to provide an electro-optical light modulating device which is simple to manufacture and which obviates the need for techniques of high precision such as microphotolithography or multilayer screen printing.

Hence, according to one aspect of the present invention there is provided a light modulating device comprising a first set of fibers and a second set of fibers being arranged to form a two dimensional array of junctions between fibers of the first set of fibers and fibers of the second set of fibers. Each of the fibers of the first and second sets of fibers includes a longitudinal conductive element, whereas fibers of at least one of the first and second sets of fibers, at least at the junctions, further include a coat of an electro-optically active substance being capable of reversibly changing its optical behavior when subjected to an electric or magnetic flux or field.

According to another aspect of the present invention there is provided a method of manufacturing a light modulating device, the method comprising the steps of (a) providing a first set of fibers and a second set of fibers, each of the fibers of the first set of fibers and the second set of fibers including a longitudinal conductive element, whereas fibers of at least one of the first and second sets of fibers further include a coat of an electro-optically active substance being in intimate contact with the conductive element, the coat of the electro-optically active substance being capable of reversibly changing its optical behavior when subjected to an electric or magnetic flux or field; and (b) arranging the fibers of the first and second sets of fibers to form a two dimensional close array of junctions therebetween. Coating the conductive elements with the electro-optically active substance according to this aspect of the present invention can be effected by, for example, extrusion, deposition from vapor phase, deposition from a solution or by any other prior art technique used for coating fibers.

According to yet another aspect of the present invention there is provided a method of manufacturing a light modulating device, the method comprising the steps of (a) providing a first set of fibers and a second set of fibers, each of the fibers of the first set of fibers and the second set of fibers including a longitudinal conductive element; (b) arranging the fibers of the first and second sets of fibers to form a two dimensional close array of junctions therebetween; and (c) coating the fibers with an electro-optically active substance to form an intimate contact with the conductive elements, the electro-optically active substance being capable of reversibly changing its optical behavior when subjected to an electric or magnetic flux or field. Coating the arranged fibers with the electro-optically active substance according to this aspect of the present invention can be effected by, for example, impregnation, soaking, dipping, laminating, printing with an electro-optically active ink, or by any other known technique.

According to further features in preferred embodiments of the invention described below, the optical behavior is selected from the group consisting of reflectance, transparency, and absorption.

According to still further features in the described preferred embodiments the optical behavior is color change.

According to still further features in the described preferred embodiments fibers of both the first and second sets of fibers include the coat of the electro-optically active substance.

According to still further features in the described preferred embodiments fibers including the coat of the electro-optically active substance are about 10 micrometers to about 2 centimeters in width.

According to still further features in the described preferred embodiments the conductive element includes a material selected from the group consisting of a metal, a metal oxide, an alloy and a conductive polymer.

According to still further features in the described preferred embodiments the material is selected from the group consisting of aluminum, tin oxide, gold, magnesium/silver alloy, indium oxide and combinations thereof.

According to still further features in the described preferred embodiments the conductive element of each of the fibers including the coat of the electro-optically active substance is about 50–99% of the total thickness of the fibers.

According to still further features in the described preferred embodiments the fibers of the first set of fibers and the fibers of the second set of fibers are arranged substantially perpendicularly to one another.

According to still further features in the described preferred embodiments the fibers of the first set of fibers and the fibers of the second set of fibers are interlocked in a woven arrangement.

According to still further features in the described preferred embodiments the device further comprising an electric or magnetic flux or field generator for generating the electric or magnetic flux or field at the junctions formed between crossing fibers of the first and second sets of fibers.

According to still further features in the described preferred embodiments the electric or magnetic flux or field has a direction selected from the group consisting of a constant direction and an alternative direction, According to still further features in the described preferred embodiments the conductive element of fibers of the first set of fibers and fibers of the second set of fibers independently have a cross section selected from the group consisting of a round cross section, an elliptical cross section, a triangular cross section, a polygonal cross section, a square cross section and a rectangular cross section.

According to still further features in the described preferred embodiments the conductive element of fibers of the first set of fibers and fibers of the second set of fibers independently have a thick to width ratio from about 1:1 to 1:2,000.

According to still further features in the described preferred embodiments the conductive element of fibers of the first set of fibers and fibers of the second set of fibers is further coated with a second coat selected from the group consisting of an insulating coat, a poor conducting coat and an anti-corrosive coat.

According to still further features in the described preferred embodiments the device further comprising a cover housing the fibers of the first set of fibers and fibers of the second set of fibers.

According to still further features in the described preferred embodiments the cover is at least partially transparent.

According to still further features in the described preferred embodiments the cover is flexible.

According to still further features in the described preferred embodiments the electro-optically active substance is an electrochromic light modulating substance, capable of reversibly changing its optical behavior when subjected to an electrochemical oxidation-reduction reaction induced by the electric or magnetic flux or field.

According to still further features in the described preferred embodiments the electro-optically active substance is an electrophoretic light modulating substance, including particles carrying a magnetic or electric charge and a fluid suspending the particles, the particles are electrophoretically dispositionable when subjected to the electric or magnetic flux or field.

According to still another aspect of the present invention there is provided an information display for use with an electronic information processing system, comprising at least one light modulating device as set forth herein.

According to an additional aspect of the present invention there is provided a decorative screen, comprising at least one light modulating device as set forth herein.

The present invention successfully addresses the shortcomings of the presently known configurations by providing an electro-optical light modulating device which is (i) readily fabricated in any desired dimensions; (ii) flexible; (iii) foldable/collapsible; (iv) simple to manufacture; and therefore (v) cost-effective.

BRIEF DESCRIPTION OF THE DRAWINGS

The invention herein described, by way of examples only, with reference to the accompanying drawings, wherein:

FIGS. 1–2 are perspective views of an electro-optical light modulating device according to the present invention; and FIGS. 3–6 are cross sectional views of individual fibers used for manufacturing the electro-optical light modulating device according to the present invention.

DESCRIPTION OF THE PREFERRED EMBODIMENTS

The present invention is of an electro-optical light modulating device which can be used to display an image by controllably changing its optical behavior at selected locations under the influence of a magnetic or electric flux or field. Specifically, the present invention can be used to provide such an electro-optical light modulating device which is (i) readily fabricated in any desired dimensions; (ii) flexible; (iii) foldable/collapsible; (iv) simple to manufacture; and therefore (v) cost-effective.

The principles and operation of an electro-optical light modulating device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1–6 illustrate several preferred embodiments of the electro-optical light modulating device according to the present invention, which is referred to hereinbelow as device 20.

Device 20 includes a first set of fibers 22 and a second set of fibers 24. Fibers 22 and 24 are arranged to form a two dimensional array of junctions therebetween, preferably such that an individual fiber 22 crosses (forms a junction with) an individual fiber 24 only once, and vice versa.

According to a preferred embodiment of the present invention, and as specifically exemplified in FIGS. 1–2, fibers 22 of the first set of fibers and fibers 24 of the second set of fibers are interlocked in a woven arrangement. This woven arrangement is presently preferred because it provided device 20 with strength and self supporting on one hand, yet maintains its flexibility and foldability/collapsibility, on the other hand. However, it will be appreciated by one ordinarily skilled in the art that other arrangements are envisaged, e.g., in which fibers 22 and 24 are substantially perpendicularly to one another, and adhered to a flexible dielectric support.

Each of fibers 22 and 24 according to the present invention includes a longitudinal conductive element 26. Fibers of at least one of the first and second sets of fibers 22, 24, and at least at the junctions formed thereamongst, further include a coat 28 of an electro-optically active substance which is capable of reversibly changing its optical behavior, such as, but not limited to, reflectance, transparency, absorption or color change, when subjected to an electric or magnetic flux or field of either a constant direction or an alternating direction.

In the embodiment shown in FIGS. 1 and 3–5, coat 28 is a solid coat of electrochromic light modulating substance coating fibers 22 (FIG. 4) or fibers 22 and 24 (FIGS. 1, 3 and 5) along their length. Other embodiments, for example, wherein solid coat 28 is present only at the junctions formed among fibers 22, 24, are envisaged. The electrochromic light modulating substance is capable of reversibly changing its optical behavior when subjected to an electrochemical oxidation-reduction reaction induced by the electric or magnetic flux or field.

A suitable electrochromic light modulating substance for use in the light modulating device according to present invention can be selected from a wide variety of known inorganic and organic electrochromic light modulating substances, such as, for example, electrochromic light modulating substances containing oxides of transition metals, e.g., $WO_3$, $MoO_3$, $TiO_2$, $V_2O_5$, $Bi_2O_3$, $Ni(OH)_2$, $IrO_2$, as well as, viologen, Prussian blue, electroactive polymers, such as, for example, polyaniline, polypyrrole, polythiophene, or other organic materials and combinations thereof.

As specifically shown in FIG. 3, coat 28 can be externally coated with an additional coat 40 of an electrolyte, preferably a solid or gel electrolyte, which completes an electrochemical cell formed between the pair of fibers 22, 24, wherein at least one of the fibers is coated with coat 28. Such electrolytes are well known and described in the prior art. See, for example, U.S. Pat. No. 5,446,577, which is incorporated by reference as if fully set forth herein.

In a particular embodiment of the present invention, one of the sets of fibers, say fibers 22, includes coats 28 of a cathodically coloring substance, for example a derivative of polythiophen, whereas the other set of fibers, say 24, includes coats 28 of an anodically coloring substance, for example a derivative of polycarbazole, coated with gel electrolyte coat 40. Such a combination provides a high contrast and fast switching electrochromism of various colors. For further details see, for example, University of Florida, on-line publication, dated Aug. 5, 1996, at http://www.chem.ufl.edu.

In a refinement of the latter embodiment of the present invention, fibers 22 include a coat 28 of an electrochromic material capable of colorless to color state transition by electrochemical oxidation, whereas fibers 24 include a coat of an electrochromic material capable of colorless to color state transition by electrochemical reduction. Such materials are well known in the art, and are described, for example, in U.S. Pat. No. 5,818,636, which is incorporated by reference as if fully set forth herein.

In the embodiment shown in FIGS. 2 and 6, coat 28 is a fluid coat which coats both fibers 22 and 24 and, being a fluid, is also present in the gaps formed between the fibers. In this case, device 20 further includes a tight cover 30 for housing fibers 22, 24 and fluid coat 28. Cover 30 is at least partially transparent and is preferably flexible, so as to maintain the inherent flexibility of the fibers arrangement of device 20. Thus, according to a preferred embodiment of the present invention, at least one side of cover 30 is transparent, whereas the other side is transparent, opaque, colored in contrast to the electrophoretically active substance, or light reflective.

It will be appreciated by one ordinarily skilled in the art that individual spots of solid or of microencapsulated fluid electro-optically active substance adhered to the arrangement of fibers 22, 24 at the junctions formed thereamongst can also be employed and serve as a discontinuous cover 28, which will otherwise perform similar to the above.

Fluid coat 28 can be either an electrochromic light modulating substance in a liquid form or an electrophoretic light modulating substance with opaque or colored particles carrying a magnetic or electric charge and a fluid suspending the particles. The particles are electrophoretically dispositionable when subjected to an electric or magnetic flux or field to thereby change the optical behavior of coat 28.

In the embodiment of FIG. 2, conductive elements 26 of fibers 22 and/or 24 can be further coated with an insulating coat 29 to avoid "cross-talk" between conducting elements 26 thereof. Additional or alternative coats, e.g., a poor conducting coat or an anti-corrosive coat can be employed in various embodiments of the invention, as desired.

According to a preferred embodiment of the present invention fibers 22 or 24 which are coated by coat 28 are about 10 micrometers to about 2 centimeters in width. The thickness of the fibers depends to a great extent on the desired application intended for device 20. Thicker fibers are selected in cases of very large devices viewed from far, whereas thinner fibers are used in smaller devices where higher resolution is required.

Thus, the required resolution provided by the junctions formed among fibers 22 and 24 depends to a great extent on the specific application of the device. For example, a junction every 30–100 micrometers is adequate for fine resolution in computer or TV screen applications, whereas for larger screens, e.g., street advertisement boards, decorative panels, etc., which are viewed from further away, a lower resolution of, say, a junction every few millimeters or few centimeters, is adequate. This implies that for some high resolution applications the width of fibers 22, 24 is selected small, e.g., 10–100 micrometers, whereas for other applications which employ larger screens, the width of fibers 22, 24 is selected larger, e.g., from 100 micrometers to 2 centimeters.

Conductive elements 26 of fibers 22 and 24 can be of a metal, a metal oxide, an alloy or a conductive polymer: e.g., aluminum, tin oxide, gold, magnesium/silver alloy, indium oxide and combinations thereof. Conductive elements 26 can also be made of a dispersion of a metal, a metal oxide, an alloy or a conductive polymer in a suitable matrix, preferably a transparent matrix, in a concentration that allows appropriate conductivity. Conductive elements 26 of each of the fibers 22 and/or 24 coated by coat 28 are preferably selected about 50–99% of the total thickness of the fibers.

Device 20 further includes an electric or magnetic flux or field generator 32 (e.g., a power source). Generator 32 serves for generating the electric or magnetic flux or field at the junctions formed between crossing fibers 22, 24 of the first and second sets of fibers, respectively. In fact, each pair of crossing fibers 22, 24 serves as a pair of electrodes, wherein at the crossing point or junction therebetween a sufficient electric or magnetic flux or field is generated to activate the electro-optically active substance to reversibly change its optical behavior. A controller 34, communicating with fibers 22, 24 and generator 32 is preferably also provided and is used to control the active junctions and therefore the image presented by device 20 at any given time.

According to one embodiment of the present invention, when a pair of crossing fibers 24, 22 are connected to generator 32, electric currents flow therethrough and through the electrochromic light modulating substance at the junction formed therebetween. According to another embodiment, when a pair of crossing fibers 24, 22 are connected to generator 32, electric currents flow therethrough and a magnetic or electric flux or field is experienced by the electrophoretic light modulating substance at the junction formed therebetween. In both cases, as a result, an optical change is evident at the junction.

Fibers 22 and/or 24 can have any desired cross section, e.g., a round cross section, an elliptical cross section, a triangular cross section, a polygonal cross section, a square cross section and a rectangular cross section. Each of conductive elements 26 of fibers 22 and/or 24 preferably has a thickness to width ratio of from about 1:1 to about 1:2,000.

Device 20 can be integrated in various systems for displaying images. Examples include, but are not limited to, electronic information processing systems harboring an information display including at least one light modulating device as set forth herein; decorative (e.g., advertising) screens including at least one light modulating device as set forth herein; etc. Thus, displays, screens, mirrors, windows, decorative panels, dynamic wallpapers, etc., are all products which will enjoy the properties of the electro-optical light modulating device according to the present invention.

According to another aspect of the present invention there is provided a method of manufacturing a light modulating device. The method according to this aspect of the invention is effected by implementing the following method steps, in which, in a first step, a first set of fibers and a second set of fibers are provided, each of the fibers includes a longitudinal conductive element, whereas fibers of at least one of the first and second sets of fibers further include a coat of an electro-optically active substance being in intimate contact with the conductive element. The coat of the electro-optically active substance is capable of reversibly changing its optical behavior when subjected to an electric or magnetic flux or field. In a second step of the method according to this aspect of the present invention, the fibers are arranged to form a two dimensional close array of junctions therebetween.

Coating the conductive elements with the electro-optically active substance according to this aspect of the present invention can be effected by, for example, extrusion, deposition from vapor phase, deposition from a solution or by any other prior art technique used for coating fibers. It will be appreciated that these techniques are all not categorized as "high precision techniques" as they are used to apply a uniform coating layer, as opposed to a precisely localized application.

According to yet another aspect of the present invention there is provided a method of manufacturing a light modulating device. The method according to this aspect of the present invention is effected by implementing the following method steps, in which, in a first step a first set of fibers and a second set of fibers are provided, each of the fibers includes a longitudinal conductive element. In a second step of the method, the fibers of the first and second sets of fibers are arranged to form a two dimensional close array of junctions therebetween. Finally, the fibers are coated with an electro-optically active substance to form an intimate contact with the conductive elements. The electro-optically active substance is capable of reversibly changing its optical behavior when subjected to an electric or magnetic flux or field. Coating the arranged fibers with the electro-optically active substance according to this aspect of the present invention can be effected by, for example, impregnation, soaking, dipping, laminating, printing with an electro-optically active ink, or by any other known technique. As before, it will be appreciated that these techniques are all not categorized as "high precision techniques" as they are used to apply a uniform coating layer, as opposed to a precisely localized application.

The light modulating device has advantages over prior art light modulating devices because it is (i) readily fabricated in any desired dimensions; (ii) flexible; (iii) foldable/collapsible; (iv) simple to manufacture; and therefore (v) cost-effective.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A light modulating device comprising a first set of fibers and a second set of fibers being arranged to form a two dimensional array of junctions between fibers of said first set of fibers and fibers of said second set of fibers, wherein each of said fibers of said first and second sets of fibers includes a longitudinal conductive element, whereas fibers of at least one of said first and second sets of fibers, at least at said junctions, further include a coat of an electro-optically active substance being capable of reversibly changing its optical behavior when subjected to an electric or magnetic flux or field.

2. The light modulating device of claim 1, wherein said optical behavior is selected from the group consisting of reflectance, transparency, and absorption.

3. The light modulating device of claim 1, wherein said optical behavior is color change.

4. The device of claim 1, wherein fibers of both said first and second sets of fibers include said coat of said electro-optically active substance.

5. The device of claim 1, wherein fibers including said coat of said electro-optically active substance are about 10 micrometers to about 2 centimeters in width.

6. The device of claim 1, wherein said conductive element includes a material selected from the group consisting of a metal, a metal oxide, an alloy and a conductive polymer.

7. The device of claim 6, wherein said material is selected from the group consisting of aluminum, tin oxide, gold, magnesium/silver alloy, indium oxide and combinations thereof.

8. The device of claim 1, wherein said conductive element of each of said fibers including said coat of said electro-optically active substance is about 50–99% of the total thickness of said fibers.

9. The device of claim 1, wherein said fibers of said first set of fibers and said fibers of said second set of fibers are arranged substantially perpendicularly to one another.

10. The device of claim 1, wherein said fibers of said first set of fibers and said fibers of said second set of fibers are interlocked in a woven arrangement.

11. The device of claim 1, further comprising an electric or magnetic flux or field generator for generating said electric or magnetic flux or field at said junctions formed between crossing fibers of said first and second sets of fibers.

12. The device of claim 11, wherein said electric or magnetic flux or field has a direction selected from the group consisting of a constant direction and an alternative direction.

13. The device of claim 1, wherein said conductive element of fibers of said first set of fibers and fibers of said second set of fibers independently have a cross section selected from the group consisting of a round cross section, an elliptical cross section, a triangular cross section, a polygonal cross section, a square cross section and a rectangular cross section.

14. The device of claim 1, wherein said conductive element of fibers of said first set of fibers and fibers of said second set of fibers independently have a thick to width ratio from about 1:1 to 1:2,000.

15. The device of claim 1, wherein said conductive element of fibers of said first set of fibers and fibers of said second set of fibers is further coated with a second coat selected from the group consisting of an insulating coat, a poor conducting coat and an anti-corosive coat.

16. The device of claim 1, further comprising a cover housing said fibers of said first set of fibers and fibers of said second set of fibers.

17. The device of claim 16, wherein said cover is at least partially transparent.

18. The device of claim 16, wherein said cover is flexible.

19. The device of claim 1, wherein said electro-optically active substance is an electrochromic light modulating substance, capable of reversibly changing its optical behavior when subjected to an electrochemical oxidation-reduction reaction induced by said electric or magnetic flux or field.

20. The device of claim 1, wherein said electro-optically active substance is an electrophoretic light modulating substance, including particles carrying a magnetic or electric charge and a fluid suspending said particles, said particles are electrophoretically dispositionable when subjected to said electric or magnetic flux or field.

21. An information display for use with an electronic information processing system, comprising at least one light modulating device as set forth in claim 1.

22. A decorative screen, comprising at least one light modulating device as set forth in claim 1.

23. A method of manufacturing a light modulating device, the method comprising the steps of:

(a) providing a first set of fibers and a second set of fibers, each of said fibers of said first set of fibers and said second set of fibers including a longitudinal conductive element, whereas fibers of at least one of said first and second sets of fibers further include a coat of an electro-optically active substance being in intimate contact with said conductive element, said coat of said electro-optically active substance being capable of reversibly changing its optical behavior when subjected to an electric or magnetic flux or field; and (b) arranging said fibers of said first and second sets of fibers to form a two dimensional close array of junctions therebetween.

24. A method of manufacturing a light modulating device, the method comprising the steps of:

(a) providing a first set of fibers and a second set of fibers, each of said fibers of said first set of fibers and said second set of fibers including a longitudinal conductive element;

(b) arranging said fibers of said first and second sets of fibers to form a two dimensional close array of junctions therebetween; and (c) coating said fibers with an electro-optically active substance to form an intimate contact with said conductive elements, said electro-optically active substance being capable of reversibly changing its optical behavior when subjected to an electric or magnetic flux or field.

* * * * *